United States Patent
Saitoh

(10) Patent No.: US 9,070,505 B2
(45) Date of Patent: Jun. 30, 2015

(54) COIL APPARATUS AND NON-CONTACT POWER TRANSMISSION APPARATUS

(75) Inventor: Yoshihiro Saitoh, Tokyo (JP)

(73) Assignee: TDK CORPORATION, Tokyo (JP)

( * ) Notice: Subject to any disclaimer, the term of this patent is extended or adjusted under 35 U.S.C. 154(b) by 775 days.

(21) Appl. No.: 13/213,574

(22) Filed: Aug. 19, 2011

(65) Prior Publication Data

US 2012/0043826 A1  Feb. 23, 2012

(30) Foreign Application Priority Data

Aug. 23, 2010 (JP) .............................. P2010-186262

(51) Int. Cl.
- H02J 17/00 (2006.01)
- H01F 38/14 (2006.01)
- H02J 5/00 (2006.01)

(52) U.S. Cl.
CPC ............... *H01F 38/14* (2013.01); *H02J 5/005* (2013.01)

(58) Field of Classification Search
CPC .............................................................. H02J 5/00
USPC ..................................................... 307/104
See application file for complete search history.

(56) References Cited

U.S. PATENT DOCUMENTS

| | | | |
|---|---|---|---|
| 6,252,386 B1 * | 6/2001 | Minami et al. | 323/355 |
| 7,456,722 B1 * | 11/2008 | Eaton et al. | 336/200 |
| 8,004,381 B2 * | 8/2011 | Katayama et al. | 336/200 |
| 8,482,159 B2 * | 7/2013 | Shimokawa | 307/104 |
| 8,664,802 B2 * | 3/2014 | Fukada | 307/104 |
| 2004/0130915 A1 * | 7/2004 | Baarman | 363/21.02 |
| 2009/0058190 A1 * | 3/2009 | Tanaka | 307/104 |
| 2009/0072629 A1 * | 3/2009 | Cook et al. | 307/104 |
| 2009/0085408 A1 * | 4/2009 | Bruhn | 307/104 |
| 2009/0230777 A1 * | 9/2009 | Baarman et al. | 307/104 |
| 2009/0243394 A1 * | 10/2009 | Levine | 307/104 |
| 2009/0243397 A1 | 10/2009 | Cook et al. | |
| 2009/0251145 A1 | 10/2009 | Kaneko et al. | |
| 2009/0289505 A1 * | 11/2009 | Baumann et al. | 307/104 |
| 2010/0033021 A1 * | 2/2010 | Bennett | 307/104 |
| 2010/0052431 A1 * | 3/2010 | Mita | 307/104 |
| 2010/0052811 A1 * | 3/2010 | Smith et al. | 333/33 |
| 2010/0109443 A1 | 5/2010 | Cook et al. | |
| 2010/0127575 A1 | 5/2010 | Joannopoulos et al. | |

(Continued)

FOREIGN PATENT DOCUMENTS

| | | |
|---|---|---|
| JP | 2009-247515 A | 10/2009 |
| JP | 2009-268181 A | 11/2009 |

(Continued)

*Primary Examiner* — Jared Fureman
*Assistant Examiner* — Carlos Laguerre
(74) *Attorney, Agent, or Firm* — Oliff PLC

(57) ABSTRACT

A coil apparatus and a non-contact power transmission apparatus having improved power transmission efficiency are provided.

A power transmission side coil apparatus comprises: an excitation coil (second winding section) which transmits AC power supplied from a power source to a transmission coil; a resonance circuit (first resonance circuit) which is formed by a capacitor (first capacitance element) and a transmission coil (first winding section) which is connected to this capacitor and which transmits AC power from the excitation coil to a power receive side coil apparatus; and a resonance circuit (second resonance circuit) which is formed by a variable capacitor (second capacitance element) and a control coil (third winding section) which is connected to this variable capacitor and which resonates with the transmission coil.

6 Claims, 15 Drawing Sheets

(56) References Cited

U.S. PATENT DOCUMENTS

| | | |
|---|---|---|
| 2010/0148589 A1 | 6/2010 | Hamam et al. |
| 2010/0164295 A1* | 7/2010 | Ichikawa et al. ............. 307/104 |
| 2010/0164296 A1 | 7/2010 | Kurs et al. |
| 2010/0187913 A1* | 7/2010 | Smith et al. .................. 307/104 |
| 2011/0025132 A1 | 2/2011 | Sato |
| 2011/0133569 A1* | 6/2011 | Cheon et al. ................. 307/104 |
| 2011/0285210 A1* | 11/2011 | Lemmens et al. ............ 307/104 |
| 2012/0161544 A1 | 6/2012 | Kashiwagi et al. |

FOREIGN PATENT DOCUMENTS

| | | |
|---|---|---|
| JP | 2010-090302 A | 4/2010 |
| JP | 2010-130878 A | 6/2010 |
| JP | A-2011-205757 | 10/2011 |
| WO | WO 2011/077493 A1 | 6/2011 |

* cited by examiner

Fig.5

| | EXCITATION COIL POSITION (MEASUREMENT POINT) | | |
|---|---|---|---|
| | INSIDE | MIDDLE | OUTSIDE |
| CONTROL COIL POSITION — INSIDE | | A (112, 111, 113) | B |
| CONTROL COIL POSITION — MIDDLE | C | | D |
| CONTROL COIL POSITION — OUTSIDE | E | F | |

COIL APPARATUS AND NON-CONTACT POWER TRANSMISSION APPARATUS

BACKGROUND OF THE INVENTION

1. Field of the Invention

The present invention relates to a coil apparatus and a non-contact power transmission apparatus.

2. Related Background Art

Magnetic resonance type power transmission which is capable of supplying power with high efficiency over relatively moderate distances by matching the resonance frequencies of a power transmission (power feed) side and a power receiver side has received attention as a non-contact power transmission technology. This technology is capable of transmitting power at high efficiency when the resonance frequencies of the power transmission side coil and the power receiver side coil are matching.

In power transmission by magnetic resonance, it is known that the power transmission efficiency and the transmission distance are dependent on the Quality Factor (Q) of the coil and the coupling coefficient k of the two coils. The coupling coefficient between the coils becomes lower as the distance between the power transmission side coil and the power receiver side coil becomes greater, but if the coil has a high Q factor, then power transmission is possible even if the coupling coefficient is low. On the other hand, when coils having a high Q value and the same or similar resonance frequencies are brought close together, the two coils affect each other and divergence in the resonance frequencies occurs, and therefore it is necessary to control the resonance frequencies.

In response to technological problems of this kind, for example, Japanese Patent Application Laid-open No. 2010-130878 describes an example in which power is transmitted with high efficiency by matching the resonance frequencies of the power transmission side coil apparatus and the power receiver side coil apparatus. When a coil is caused to resonate by the coil inductance and stray capacitance, with the object of matching the resonance frequencies of the coil apparatus on the power transmission and power receiver sides, there may be divergence in the resonance frequencies due to variation in the coil, or the like, but the invention described in Japanese Patent Application Laid-open No. 2010-130878 discloses technology in which a variable capacitor is added externally to the inductance of the coil and the resonance frequency is adjusted by adjusting the variable capacitor. In the embodiment described therein, there is no problem if the position is fixed, but re-adjustment of the resonance frequency is necessary if there has been even slight positional divergence.

Furthermore, Japanese Patent Application Laid-open No. 2009-268181 describes a composition which comprises a resonance frequency adjustment circuit for adjusting and setting the resonance frequency, and proposes controlling the resonance frequency by connecting a variable capacitor and/or a variable inductor to the transmission coil. If a variable capacitor or a variable inductor is adjusted in the transmission coil, then there is a risk of this giving rise to reduction in the Q value due to the effects of external elements.

Furthermore, Japanese Patent Application Laid-open No. 2010-93902 discloses an example in which the Q values of the power transmission coil and the power receive coil fall and the efficiency declines, if power is transmitted by a non-contact method between a transmission side coil which constitutes a resonance circuit and a power receiver side coil which constitutes a resonance circuit, but decline in the efficiency is reduced if a resonance circuit which is formed by a third coil as a control coil and a capacitor is inserted between the transmission side coil and the receiver side coil so as to be magnetically coupled with both coils.

However, in the compositions described in Japanese Patent Application Laid-open No. 2010-130878, Japanese Patent Application Laid-open No. 2009-268181 and Japanese Patent Application Laid-open No. 2010-93902, divergence in the resonance frequency of the transmission coils of the power transmission side coil apparatus and the power receive side coil apparatus has not been investigated sufficiently.

For example, in Japanese Patent Application Laid-open No. 2010-130878, in the embodiment described therein, there is an issue in that, although there is no problem if the position is fixed, re-adjustment of the frequency is necessary if there has been even slight positional divergence. Furthermore, in Japanese Patent Application Laid-open No. 2009-268181, if a variable capacitor or a variable inductor is adjusted in the transmission coil, then there is a risk of this giving rise to a fall in the Q value due to the effects of external elements.

SUMMARY OF THE INVENTION

The present invention was devised in view of the foregoing, an object thereof being to provide a coil apparatus and a non-contact power transmission apparatus in which the power transmission efficiency is raised.

In order to achieve the aforementioned object, the coil apparatus according to an aspect of the present invention is a coil apparatus for a non-contact power transmission apparatus constituted by a power transmission coil apparatus to which AC power is input and a power receive coil apparatus which outputs AC power from the power transmission coil apparatus; wherein at least one of the power transmission coil apparatus and the power receive coil apparatus includes: a first winding section which constitutes a first resonance circuit together with a first capacitance element; a second winding section which is magnetically coupled to the first winding section; and a third winding section which constitutes a second resonance circuit together with a second capacitance element, and which is magnetically coupled to the first winding section.

In the coil apparatus described above, since at least one of the power transmission coil apparatus and the power receive coil apparatus comprises a second resonance circuit which couples magnetically with the first resonance circuit, then it is possible to correct divergence in the resonance frequency occurring in the power transmission coil apparatus and the power receive coil apparatus, by means of the second resonance circuit. Therefore, it is possible to reduce the divergence in the resonance frequency which occurs in the power transmission coil apparatus and the power receive coil apparatus, and the power transmission efficiency is raised. Furthermore, since there is no need to modify the excitation coil or the transmission coil when adjusting for divergence in the resonance frequencies, it is possible to adjust for divergence easily, and the power transmission efficiency can be raised easily.

Here, an example of a composition which achieves the aforementioned action effectively is a mode wherein a winding region formed by the third winding section is larger than a winding region formed by the second winding section, and in a plan view in a plane intersecting with a winding axis of the second winding section or the third winding section, the winding region formed by the second winding section is formed on the inside of the winding region formed by the third winding section.

Furthermore, an example of a further composition which achieves the aforementioned action effectively is a mode wherein a winding region formed by the third winding section is larger than a winding region formed by the first winding section, and in a plan view in a plane intersecting with a winding axis of the first winding section or the third winding section, the winding region fanned by the first winding section is formed on the inside of the winding region formed by the third winding section.

Furthermore, it is also possible to adopt a mode in which a resonance frequency of the first resonance circuit is smaller than a resonance frequency of the second resonance circuit.

Moreover, the non-contact power transmission apparatus according to an aspect of the present invention comprises the coil apparatus described above.

According to the present invention, a coil apparatus and a non-contact power transmission apparatus having improved power transmission efficiency are provided.

BRIEF DESCRIPTION OF THE DRAWINGS

FIG. 5 is a table summarizing an arrangement of an excitation coil, a transmission coil and a control coil;

FIG. 12A shows an example where a capacitor connected to a control coil is switched using a switch; FIG. 12B shows an example in which a capacitor C3 is connected in series in addition to the capacitors C1 and C2 which are connected in parallel as shown in FIG. 12A; FIG. 12C shows a case where a plurality of capacitors C2 are connected in series to form a parallel connection with the basic capacitor C1, and switches are provided for each of these capacitors C2 in such a manner that they can be shorted; FIG. 12D shows a case where a plurality of inductors provided with switches are connected in series, in addition to the basic capacitor C1, and these inductors can be switched; and FIG. 12E shows a case where capacitors and an inductors are connected in series, and are also connected respectively in parallel;

FIG. 15A is a diagram showing frequency characteristics of a transmission coil 20 alone, FIG. 15B is a diagram showing frequency characteristics in a case where the transmission coils 20A and 20B are arranged in close mutual proximity, and FIG. 15C is a diagram showing frequency characteristics in a case where the transmission coils 20A and 20B are arranged more closely together than in FIG. 15B.

DESCRIPTION OF THE PREFERRED EMBODIMENTS

Figure 1:
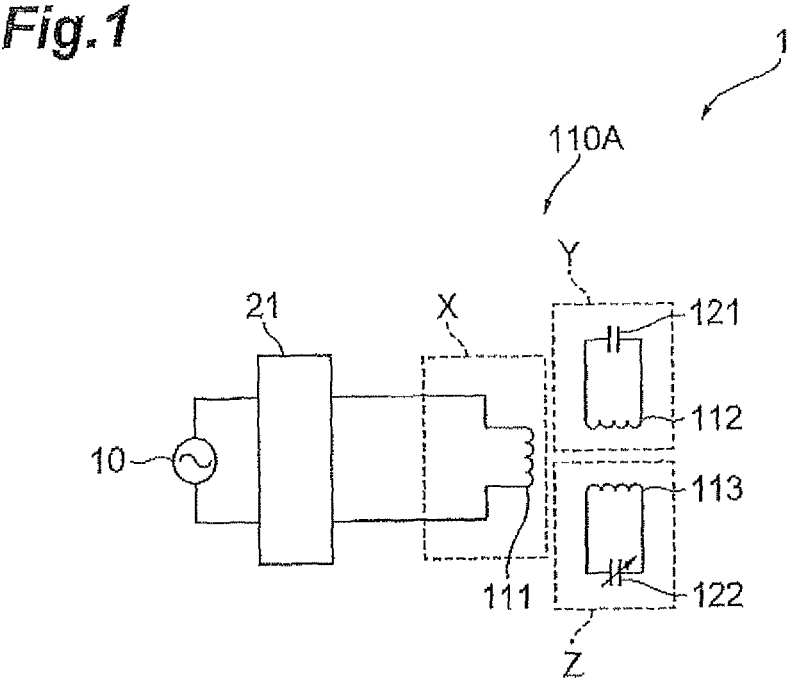
FIG. 1 is a circuit diagram showing the composition of a power transmission side coil apparatus as a coil apparatus relating to the present embodiment.

Below, a mode of implementing the present invention is described in detail with reference to the accompanying drawings. In the description of the drawings, the same elements are labeled with the same reference numerals, and repeated description is omitted.

PRIOR ART

Figure 13:
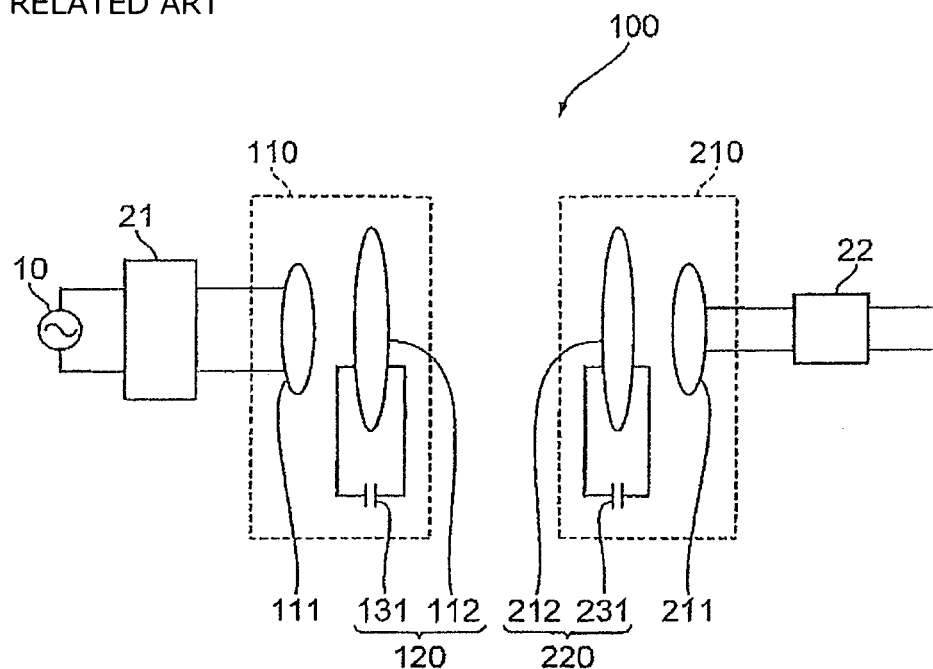
FIG. 13 is a diagram showing a composition of a coil apparatus for a non-contact power transmission apparatus, which is constituted by a power transmission side coil apparatus and a power receiver side coil apparatus.

Firstly, before describing the coil apparatus relating to the present invention, the general composition of a magnetic resonance type of coil apparatus will be described with reference to FIGS. 13 to 15. FIG. 13 is a diagram showing a composition of a coil apparatus for a non-contact power transmission apparatus, which is constituted by a power transmission side coil apparatus and a power receiver side coil apparatus. In the coil apparatus 100, the left-hand side is a power transmission side coil apparatus 110 and the right-hand side is a power receiver side coil apparatus 210. The power transmission side coil apparatus 110 is constituted by a transmission coil 112 which performs power transmission by using magnetic resonance, a capacitor 131 which is connected to the transmission coil 112, and an excitation coil 111 for transmitting externally input power to the transmission coil 112 side. The transmission coil 112, together with the capacitor 131, forms a resonance circuit having a prescribed resonance frequency, and a power transmission side transmission coil component 120 is constituted by the transmission coil 112 and the capacitor 131. An AC power having a frequency matched to the resonance frequency of the power transmission side transmission coil component 120 is supplied from the power source 10 to the excitation coil 111 of the power transmission side coil apparatus 110. An impedance matching apparatus 21 for matching the impedances may also be provided between the power source 10 and the power transmission side coil apparatus 110.

Furthermore, the power receiver side coil apparatus 210 is constituted by a transmission coil 212 which receives power by using magnetic resonance, a capacitor 231 which is connected to the transmission coil 212, and an excitation coil 211 which outputs the power received in the transmission coil 212, from the power receiver side coil apparatus 210. The transmission coil 212, together with the capacitor 231, forms a resonance circuit having a prescribed resonance frequency, and a power receiver side transmission coil component 220 is constituted by the transmission coil 212 and the capacitor 231. In FIG. 13, an impedance matching apparatus 22 is provided after the power receiver side coil apparatus 210, and power which has passed through the impedance matching apparatus 22 is supplied to a load circuit (not illustrated) which is provided at a later stage.

Figure 14A:
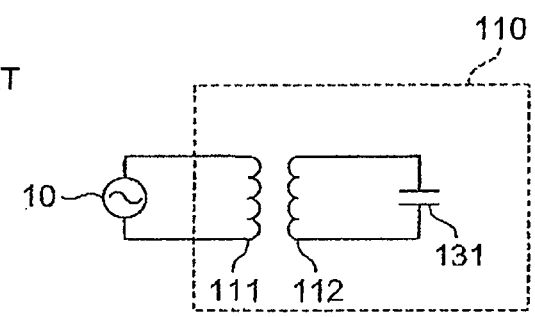
FIG. 14A is a circuit diagram of a power transmission side coil apparatus and a power source.
Figure 14B:
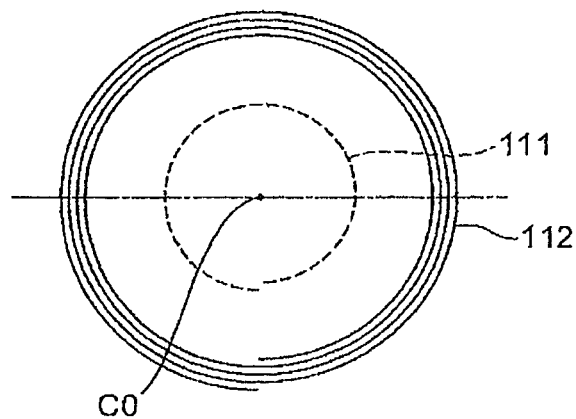
FIG. 14B is a plan diagram of a power transmission side coil apparatus.

The power transmission side coil apparatus 110 and the power receiver side coil apparatus 210 have virtually the same composition. FIG. 14A is a circuit diagram of a power transmission side coil apparatus 110 and a power source 10, and FIG. 14B is a plan diagram of a power transmission side coil apparatus 110. As shown in FIG. 14A, a capacitor 131 is connected to the transmission coil 112, and the excitation coil 111 and the transmission coil 112 are not connected directly. Furthermore, the plan diagram in FIG. 14B is a view of the excitation coil 111 and the transmission coil 112 from a direction of the winding axis of the excitation coil 111 and the transmission coil 112 (the direction in which the winding axis C0 extends), in other words, a plan view in the plane perpendicular to the winding axis C0. In this power transmission side coil apparatus 110, in addition to an excitation coil 111 being provided on the inner side, a transmission coil 112 is provided on the outer side. In other words, the winding region which indicates the region in which the transmission coil 112 is wound is greater than the winding region which indicates the region in which the excitation coil 111 is wound.

Figure 15A:
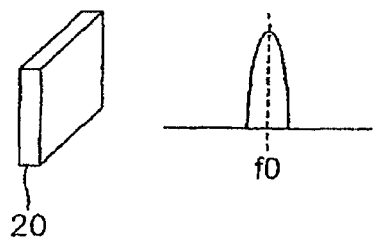
FIGS. 15A to 15C are diagrams illustrating frequency characteristics of a transmission coil of a power transmission side coil apparatus and a transmission coil of a power receive side coil apparatus.
Figure 15B:
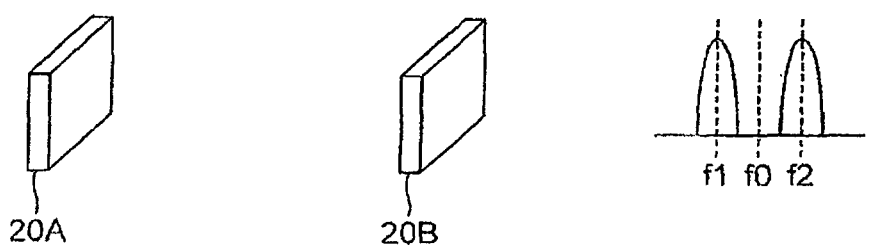
Figure 15C:
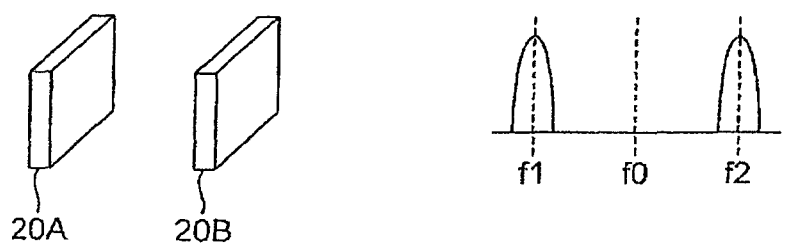

Here, the coupling coefficient between the coils becomes lower as the distance between the transmission coil on the power transmission side and the transmission coil on the power receiver side coil becomes greater, but if the coil has a high Q factor, then power transmission is possible even if the coupling coefficient is low. On the other hand, when coils having a high Q value and the same or similar resonance frequencies are brought close together, the two coils affect each other and divergence in the resonance frequencies occurs. FIG. 15 shows a schematic view of this. FIGS. 15A to 15C are diagrams for explaining the frequency characteristics of the impedance of the power transmission side transmission coil component of the power transmission side coil apparatus and the power receiver side transmission coil component of the power receiver side coil apparatus. FIG. 15A is a diagram showing the frequency characteristics of the impedance of the transmission coil 20 alone, which indicates that the resonance frequency is f0. In a state where the coils are sufficiently separated so as not to be magnetically coupled to each other, the resonance frequencies of the respective transmission coil components of the power transmission side coil apparatus and the power receiver side coil apparatus are both f0. If the transmission coils 20A and 20B are brought close together as shown in FIG. 15B, then the transmission coils 20A, 20B affect each other and assume a resonance frequency f1 which is lower than the resonance frequency f0 of the transmission coil component alone, and a resonance frequency f2 which is higher than the resonance frequency f0. Furthermore, when the transmission coils 20A, 20B are brought even closer together compared to FIG. 15B, as shown in FIG. 15C, then the resonance frequencies f1, f2 diverge even further than the case shown in FIG. 15B.

For this reason, divergence in the resonance frequency occurs in the power transmission side transmission coil components of the power transmission side coil apparatus and the power receiver side transmission coil components of the power receiver side coil apparatus, and there is a problem in that power transmission efficiency may decline.

Embodiment of the Present Invention

Next, a coil apparatus relating to an embodiment of the present invention will be described. FIG. 1 is a circuit diagram showing only the power transmission side coil apparatus (power feed side coil apparatus) 110A of the coil apparatus 1 relating to the present embodiment. More specifically, of the various units which constitute the power transmission side coil apparatus (power feed side coil apparatus) 110A, the excitation coil 111 (second winding section) X which is coupled magnetically to the transmission coil 112 and transmits AC power sent from the power source 10 via the impedance matching apparatus 21 to the transmission coil 112, and the resonance circuit (first resonance circuit) Y which is constituted by the capacitor 121 (first capacitance element) and the transmission coil 112 (first winding section) which is connected to this capacitor 121 and which transmits AC power from the excitation coil 111 to the power receiver side coil apparatus, are similar to the composition shown in FIG. 13. The resonance circuit (second resonance circuit) Z which is formed by the variable capacitor 122 (second capacitance element) and the control coil 113 (third winding section) which is connected to this variable capacitor 122 and coupled magnetically to the transmission coil 112 form a newly provided part of the composition. Here, the capacitor 121 may be formed by a capacitor element which is provided separately from the transmission colt 112, or may be formed by the parasitic capacitance of the transmission coil 112. Furthermore, it may also be formed by a capacitor element and the parasitic capacitance of the transmission coil 112.

In FIG. 1, though the arrangement of the excitation coil 111, the transmission coil 112, and the control coil 113 are depicted as being unrelated, these coils are arranged in such a manner that their winding axes coincide with each other, and the positional relationship between the three coils can be changed appropriately. In other words, any one of the coils may be wound about the outside of any one of the other coils, and yet a further coil may be wound about the outside of this.

Figure 2:
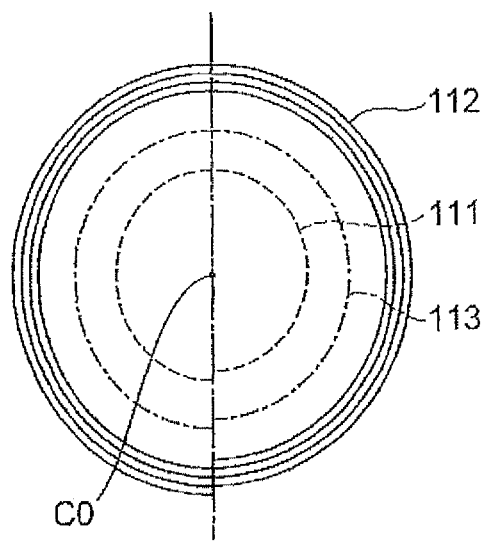
FIG. 2 is a plan diagram showing an arrangement of an excitation coil, a transmission coil and a control coil.
Figure 3:
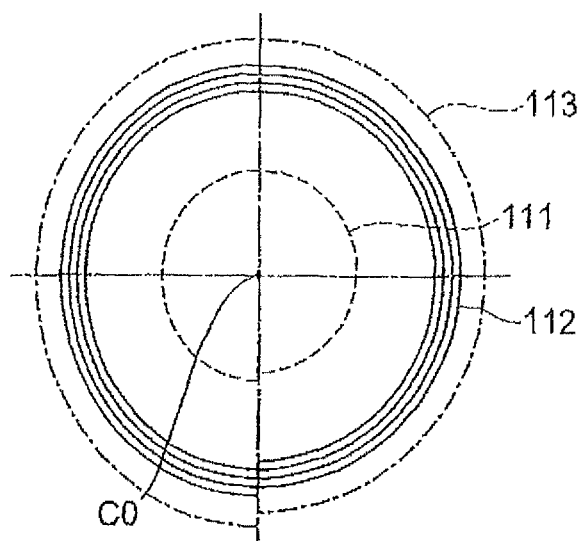
FIG. 3 is a plan diagram showing an arrangement of an excitation coil, a transmission coil and a control coil.
Figure 4:
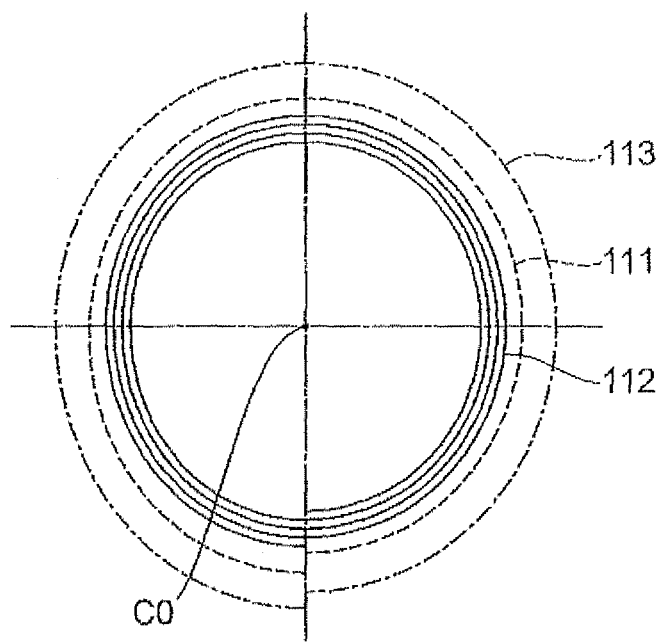
FIG. 4 is a plan diagram showing an arrangement of an excitation coil, a transmission coil and a control coil.

FIGS. 2 to 4 show concrete examples. FIGS. 2 to 4 show an excitation coil 111, a transmission coil 112 and a control coil 113 viewed in a direction of the winding axis of the excitation coil 111, the transmission coil 112 and the control coil 113, in other words, a diagram showing a plan view in a plane perpendicular to the winding axis C0, in a case where the excitation coil 111, the transmission coil 112 and the control coil 113 are provided in the same plane. FIG. 2 shows an example where the transmission coil 112 is provided to the outside of the excitation coil 111, and the control coil 113 is provided between the excitation coil 111 and the transmission coil 112, whereby the winding region of the control coil 113 is larger than the winding region indicating the region in which the excitation coil 111 is wound, and furthermore, the winding region of the transmission coil 112 is larger than the winding region of the control coil 113. FIG. 3 shows an example where the control coil 113 is provided to the outside of the excitation coil 111 and the transmission coil 112, and the winding region of the transmission coil 112 is larger than the winding region of the excitation coil 111, while the winding region of the control coil 113 is larger than the winding region of the transmission coil 112. FIG. 4 shows an example where the excitation coil 111 is provided to the outside of the transmission coil 112, and the control coil 113 is provided further to the outside thereof: the winding region of the excitation coil 111 is larger than the winding region of the transmission coil 112, while the winding region of the control coil 113 is larger than the winding region of the excitation coil 111. In this way, a plurality of combinations can be envisaged for the positional relationships of the three coils: the excitation coil 111, the transmission coil 112 and the control coil 113, but once the relative positional relationships of the three coils have been designated, each of the coils is fixed in position in such a manner that there is no mutual change in their positions.

FIG. 5 shows the arrangement of the excitation coil 111, the transmission coil 112 and the control coil 113 in a matrix configuration, by dividing the positions of the excitation coil and the control coil into three categories. The lateral direction indicates the position of the excitation coil and the vertical direction indicates the position of the control coil. Furthermore, "inside" means a position on the innermost side of the three coils, "middle" means a position between two coils, and "outside" means a position outside of two coils.

As shown in FIG. 5, the arrangement of the three coils can be divided into 6 categories (A to F of FIG. 5). Therefore, the type of change occurring in the resonance frequency when using a control coil in each of these coil arrangements was investigated for these six categories.

Figure 6:
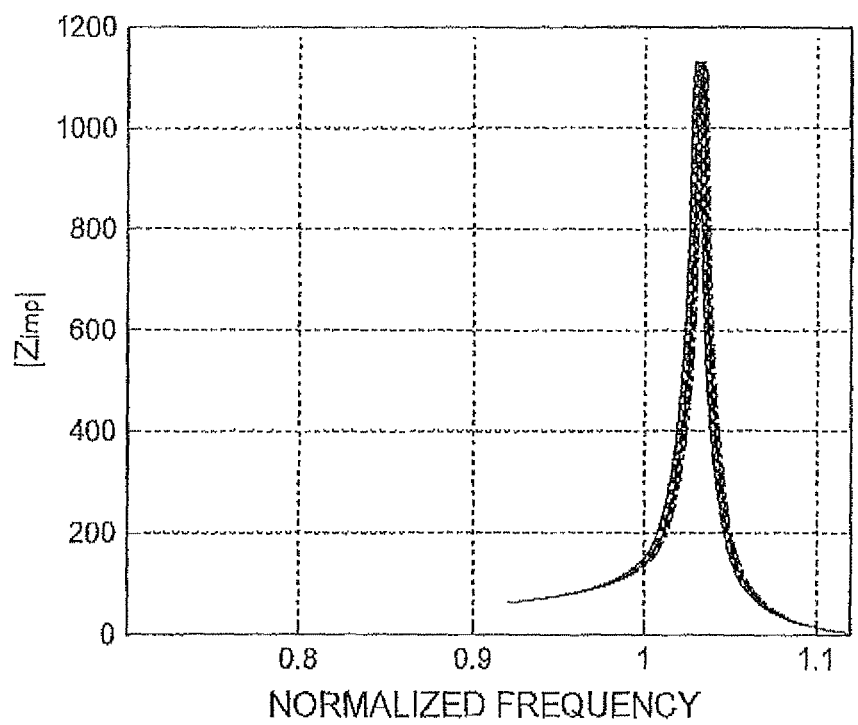
FIG. 6 is a diagram showing the results (A) of investigating the resonance frequency of the transmission coil.
Figure 7:
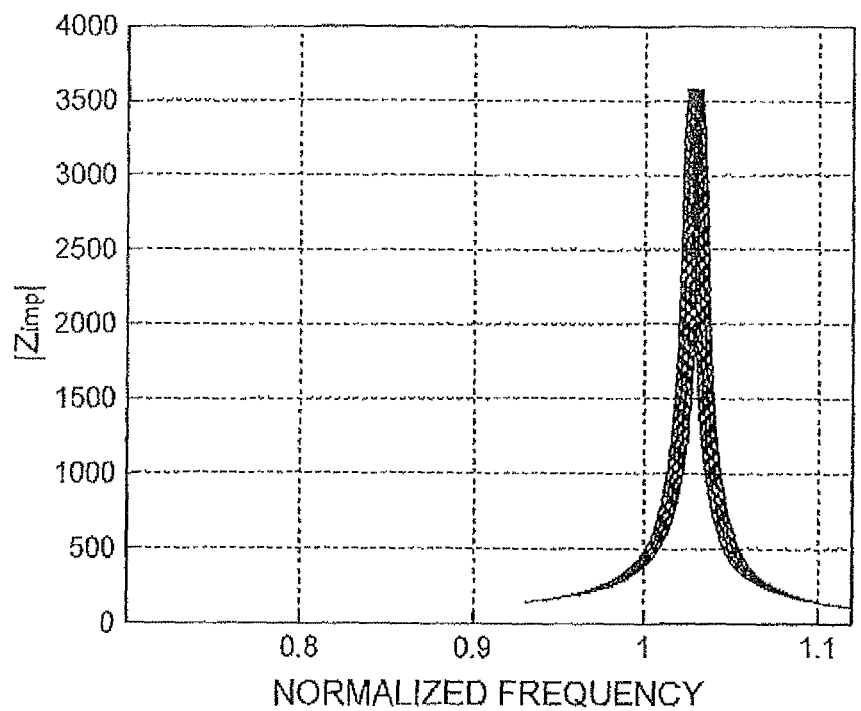
FIG. 7 is a diagram showing the results (B) of investigating the resonance frequency of the transmission coil in relation to the resonance frequency of the excitation coil.
Figure 8:
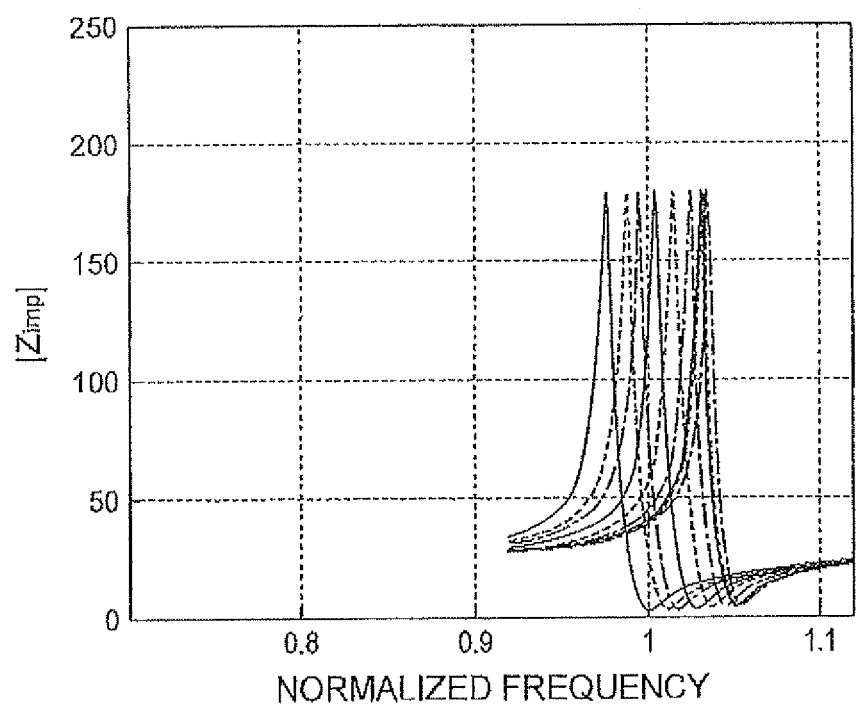
FIG. 8 is a diagram showing the results (C) of investigating the resonance frequency of the transmission coil in relation to the resonance frequency of the excitation coil.

More specifically, a transmission coil 112 having a capacitor attached to either end was prepared, the size of the winding section of this coil being fixed, whereas a plurality of coils having winding sections of different sizes were prepared for the excitation coil 111 and the control coil 113, and a variable capacitor was connected to the control coil 113. With the three coils arranged in the positional relationship shown in FIG. 5, a plurality of measurements of the frequency characteristics and the impedance characteristics of the impedance of the coil apparatus were taken, while varying the electrostatic capacitance value of the variable capacitor. FIGS. 6 to 11 show the results in a case where the range of change in the static capacitance of the variable capacitor was the same in all cases. FIG. 6 corresponds to the results for measurement with the arrangement in A of FIG. 5, and FIGS. 7 to 11 respectively correspond to B to F of FIG. 5. In each of these diagrams, the horizontal axis indicates the frequency (the normalized frequency which is normalized by the same prescribed frequency in all cases) and the vertical axis indicates the absolute impedance value.

Figure 9:
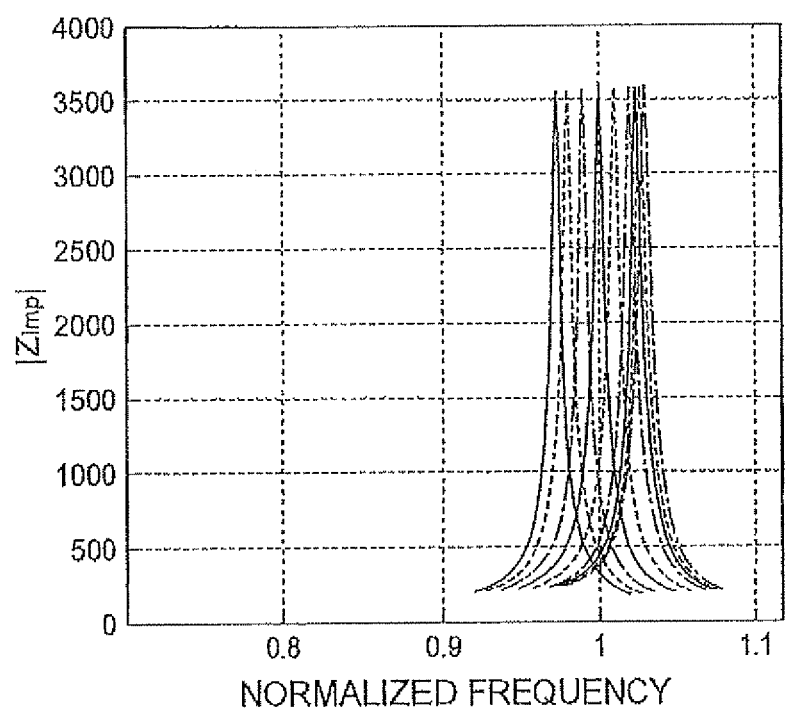
FIG. 9 is a diagram showing the results (D) of investigating the resonance frequency of the transmission coil in relation to the resonance frequency of the excitation coil.
Figure 10:
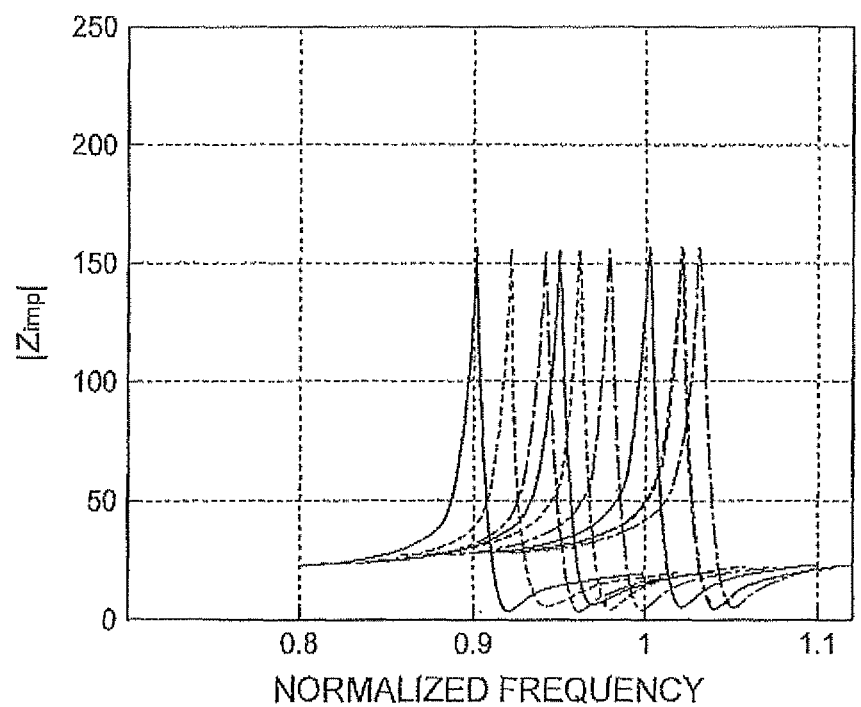
FIG. 10 is a diagram showing the results (E) of investigating the resonance frequency of the transmission coil.
Figure 11:
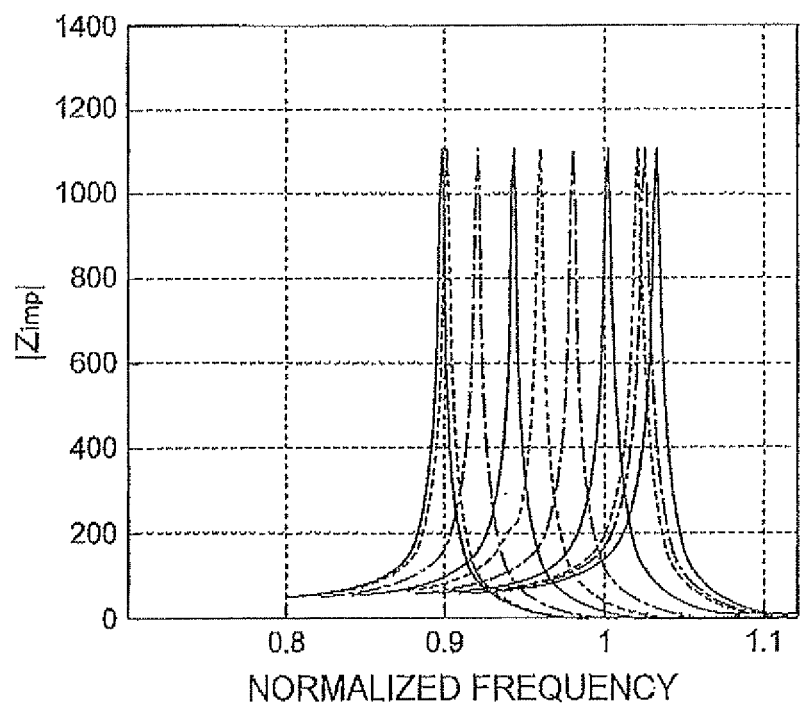
FIG. 11 is a diagram showing the results (F) of investigating the resonance frequency of the transmission coil.

As a result of this, it was confirmed that, in a combination where the size of the control coil 113 is larger than that of the excitation coil 111 (C, E and F of FIG. 5, and FIGS. 8, 10, 11), the resonance frequency changes greatly due to the change in the value of the variable capacitor which is connected to the control coil 113. Furthermore, it was also confirmed that in a combination where the size of the control coil 113 is larger than that of the transmission coil 112 (D, E and F of FIG. 5; FIGS. 9, 10, 11), the amount of change in the frequency range is large. This result indicates that the resonance frequency of the transmission coil can be adjusted suitably by changing the value of the variable capacitor.

Furthermore, if the control coil 113 is on the innermost side (A and B of FIG. 5 and FIGS. 6 and 7), then the range of the resonance frequency variation is small compared to the other examples. This is because the inductance of the control coil becomes relatively small, and the range of the resonance frequency variation can be adjusted by changing the capacitance value of the variable capacitor. However, if adjustment to make slight change in the resonance frequency is necessary, that is, for example, if the coil components become separated from each other and there is a slight frequency variation, or if there is virtually no variation in the inter-coil distance but there is a slight resonance frequency variation due to divergence in the winding axis or the like, frequency control to cause slight change in the resonance frequency can be performed by adjusting the capacitance of the variable capacitor by providing the control coil 113 on the innermost side.

It was confirmed that, by providing the control coil 113 in addition to the excitation coil 111 and the transmission coil 112 of the coil apparatus as described above, the resonance frequency of the transmission coil 112 can be adjusted. Furthermore, it was also confirmed that adjustment of the resonance frequency is possible by changing the capacitance of the capacitor (capacitance element) which is connected to the control coil 113.

Here, in the above embodiment, the composition in which a second resonance circuit is constituted by a control coil 113 and a variable capacitor 122, and the electrostatic capacitance value is changed by connecting the variable capacitor 122 to the control coil 113 is described. It is also possible to adopt a composition in which a second resonance circuit is constituted by the control coil 113, and a reactance including a capacitance component based on a capacitor element connected to the control coil 113 or a capacitance component based on the parasitic capacitance of the control coil 113, and in which the reactance is changed with respect to the control coil. In other words, it is possible to adopt a composition which changes the reactance including a capacitance component, and this capacitance may be a fixed value, or a variable value. Possible examples of a composition for changing the reactance are one which connects an inductor and one using a switch, or the like.

Figure 12A:
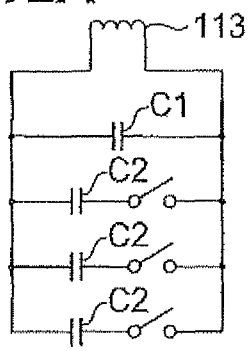
FIGS. 12A to 12E are diagrams showing examples of the connection of a capacitance element to a control coil.

FIGS. 12A to 12E show examples thereof. FIG. 12A is an example in which the capacitor C2 connected to the control coil 113 is switched using a switch. In FIG. 12A, a switch is not provided for the capacitor C1 which is the basis for specifying the resonance frequency of the control coil, but it is of course possible to adopt a composition in which switches are installed on all of the capacitors, and it is also possible to reduce the number of switches. Furthermore, the switches may be mechanical switches or they may be semiconductor switches, or the like. In FIG. 12A, pluralities of capacitors are connected in parallel, and therefore it is possible to reduce the resonance frequency created by capacitors and the inductance of the control coil 113.

Figure 12D:
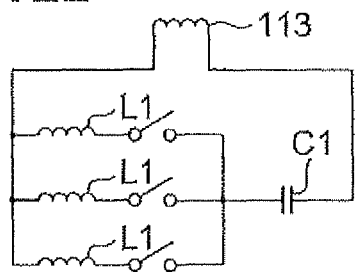
Figure 12B:
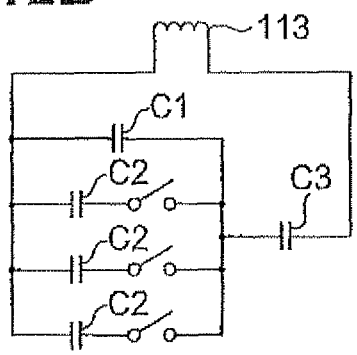

FIG. 12B shows an example in which a capacitor C3 is connected in series in addition to the capacitors C1 and C2 which are connected in parallel as shown in FIG. 12A.

Figure 12E:
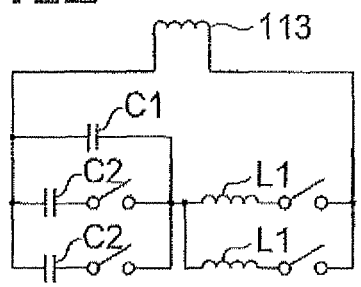
Figure 12C:
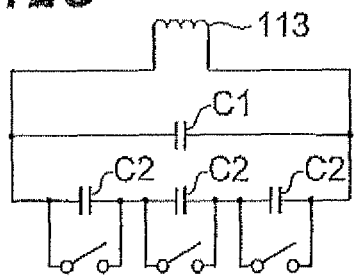

FIG. 12C shows a case where a plurality of capacitors C2 are connected in series to form a parallel connection with the basic capacitor C1, and switches are provided for each of these capacitors C2 in such a manner that they can be shunted.

FIG. 12D shows a case where a plurality of inductors provided with switches are connected in series, in addition to the basic capacitor C1, and these inductors can be switched.

FIG. 12E shows a case where a capacitor and an inductor are connected in series, and are also connected respectively in parallel.

In this way, the resonance frequency of the control coil 113 can be changed freely by using the capacitors or inductors, etc. Desirably, the capacitors and inductor selected for the capacitors C1 to C3 and the inductor L1 which are used to control the control coil 113 have a higher self-resonance point than the resonance frequency set by the control coil 113.

Apart from the foregoing, there is also a method where the capacitance of the capacitor or the inductance of the inductor is changed mechanically. For example, there is a method in which a capacitor is formed by two metal plates, and the distance between the metal plates or the amount of overlap in plan view is changed mechanically, or a method where a magnetic core is inserted to a certain extent inside a round cylindrical coil, and these methods can be selected and used as appropriate.

In the present embodiment, the transmission coil 112 has a lower resonance frequency than the control coil 113 because the coil is wound in such a manner that the inductance of the transmission coil 112 is larger when compared to the inductance of the control coil 113. However, it is also possible to change the resonance frequency of the control coil 113 by enlarging the size of the capacitor used; for example, the resonance frequency can be made lower than the resonance frequency of the transmission coil 112. Furthermore, it is also possible to wind the coil in such a manner that the inductance of the control coil 113 is larger than the inductance of the transmission coil 112. In this way, there are no particular restrictions on the relationship between the resonance frequencies and the relationship between the inductances of the control coil 113 and the transmission coil 112.

If the resonance frequency of the control coil 113 is higher than the resonance frequency of the transmission coil 112, then the inductance of the control coil 113 and the capacitor used for resonance can be made small. This is a major merit in design terms, because when investigating the layout of the coil apparatus, the number of turns of the control coil 113 can be made small and the size of the capacitor used in the control coil 113 can be made small.

Furthermore, if the adjustment range of the resonance frequency is to be enlarged, then a mode may be adopted which enables the resonance frequency of the control coil 113 to be adjusted from a low state to a high state with respect to the resonance frequency of the transmission coil 112. If broad frequency control is possible in this way, then a coil apparatus which corresponds to the different frequencies of a plurality of devices can be achieved. In other words, desirably, the composition of the control coil 113 is changed appropriately in accordance with the use environment of the coil apparatus.

As described above, according to the coil apparatus relating to the present embodiment, it is possible to use the control coil to adjust for divergence in the resonance frequency arising in the power transmission side coil apparatus and the power receiver side coil apparatus, and therefore even higher transmission efficiency can be achieved.

Furthermore, if the winding region formed by the control coil 113 is larger than the winding region formed by the excitation coil 111, and if the winding region formed by the excitation coil 111 is formed inside the winding region formed by the control coil 113, then adjustment on the basis of the control coil 113 can be performed through a broader range, and therefore higher transmission efficiency can be achieved.

Similarly, if the winding region formed by the control coil 113 is larger than the winding region formed by the transmission coil 112, and if the winding region formed by the transmission coil 112 is formed inside the winding region formed by the control coil 113, then adjustment on the basis of the control coil 113 can be performed through a broader range, and therefore higher transmission efficiency can be achieved.

Furthermore, by forming the capacitor 122 as a variable capacitor, the capacitance can change freely and control of the resonance frequency using the second resonance circuit formed by the variable capacitor 122 and the control coil 113 becomes simpler, thus making it possible to achieve improvement in the power transmission efficiency more easily.

Furthermore, in the coil apparatus of the embodiment described above, the resonance frequency is adjusted by using a control coil which is not connected directly to the transmission coil. In other words, the transmission coil is not controlled directly. The factors which ultimately determine the performance of power transmission system based on a magnetic resonance are the Q (Quality Factor) of the coil and the coupling coefficient k between the power transmission and power receive coils, but if any kind of mechanism is attached to the transmission coil, the Q value falls and the performance declines. Consequently, according to the coil apparatus of the present embodiment, the transmission coil is not controlled directly (in terms of control for adjusting the resonance frequency), and therefore decline in performance can be suppressed.

An embodiment of the present invention was described above, but the present invention is not limited to the aforementioned embodiment. The embodiment described above was explained in relation to a composition where a resonance circuit Z including a control coil 113 is provided for a power transmission side coil apparatus 110A, alternatively, for example, it is also possible to provide the aforementioned composition in a power receiver side coil apparatus, or to provide the aforementioned composition only in at least one coil apparatus. Furthermore, there does not have to be a one-to-one relationship between the power transmission side coil apparatus and the power receiver side coil apparatus, and even if there are a plurality of power receiver side coil apparatuses corresponding to one power transmission side coil apparatus, for example, the composition of the present embodiment can still be applied.

In the embodiment described above, once the relative positions of the excitation coil 111, the transmission coil 112 and the control coil 113 have been specified, the coils are fixed in such a manner that their relative positions do not move, furthermore, it is also possible to adopt a composition where the control coil 113 only is not fixed, but is movable relatively with respect to the excitation coil 111 and the transmission coil 112. It is also possible to adopt a composition where all of the coils are relatively movable, or a composition where any one of the coils is wound about the outside of any one of the other coils, and the remaining coil is wound about the outside thereof. In other words, it is also possible to adopt a composition in which the winding region of any one coil is larger than the winding region of any one of the other coils, and the winding region of the remaining coil is larger than these winding regions. In other words, the sizes of the winding regions are set in such a manner that if the plurality of coils are arranged on the same plane, then the winding region of any one of the coils is contained in the winding region of any one of the other coils, and these two winding regions are contained in the winding region of the remaining coil. More specifically, the size of the winding region of a coil indicates the area of the winding region when viewed in plan view. There are no particular restrictions on the number of windings of the coil, and the number of windings may be less than 1. Here, a composition where the number of windings of the coil is less than one and the winding region formed by the coil having less than one winding is larger than the winding region of the other coils means a case where the coil having less than one winding is provided to the outside of the winding region formed by the winding of the other coil.

Furthermore, in the embodiment described above, a case was described where the excitation coil 111, the transmission coil 112 and the control coil 113 are located in the same plane, but the positions of these coils are not limited to the same plane, and it is also possible for the control coil 113 only, for instance, to be displaced in the vertical direction, or to be positioned eccentrically with respect to the transmission coil 112. Moreover, any one of the excitation coil 111, the transmission coil 112 and the control coil 113 may form a three-dimensional shape. Even in a case where the coil arrangement is displaced three-dimensionally as described above, a composition should be adopted in which, in a plan view in a plane perpendicular to the winding axis, the winding region of any one coil of the excitation coil 111, the transmission coil 112 and the control coil 113 is positioned on the inside of the winding region of any one of the other coils, and the winding region of the remaining coil is positioned on the inside of these two winding regions, and in this case, it is possible to obtain the same effect as described in the embodiment.

Furthermore, in the embodiment described above (in particular, FIGS. 2 to 4), the positional relationship of three coils was described in terms of the size of the winding regions of the coils, using a diagram showing a plan view in a plane perpendicular to the winding axis, but the positional relationship is not limited to a plane perpendicular to the winding axis and if the excitation coil 111, the transmission coil 112 and the control coil 113 are in a positional relationship as stated in the aforementioned embodiment, in a plan view in a plane which intersects with the winding axis, then it is possible to obtain the same effect as described in the embodiment.

Furthermore, the coils may not be wound in a circular shape as in the embodiment described above, and may be wound in a triangular, quadrilateral or other polygonal shape, or a three-dimensional shape (for example, a conical shape). Moreover, provided that the control coil 113 and the transmission coil 112 are magnetically coupled, then the beneficial effects of the present invention are obtained, and therefore, a composition may be adopted in which the transmission coil 112 and the excitation coil 111 are accommodated in the same frame, for example, and only the control coil 113 is provided outside the frame, or may also be provided in a separate frame.

What is claimed is:

1. A coil apparatus for a non-contact power transmission apparatus constituted by a power transmission coil apparatus to which AC power is input and a power receive coil apparatus which outputs AC power from the power transmission coil apparatus,
    wherein one of the power transmission coil apparatus and the power receive coil apparatus includes:
    a first winding section which constitutes a first resonance circuit together with a first capacitance element, the first winding section being a transmission coil;
    a second winding section which constitutes an excitation coil, and which is magnetically coupled to the first winding section; and
    a third winding section which constitutes a second resonance circuit together with a second capacitance element, and which is magnetically coupled to the first winding section, the third winding section being a control coil that adjusts a resonance frequency of the first resonance circuit; and
    wherein (1) if the second winding is for the power transmission coil apparatus, the second winding is connected to a power source, and (2) if the second winding is for the power receive coil apparatus, the second winding is connected to a load; and
    the resonance frequency of the first resonance circuit is smaller than a resonance frequency of the second resonance circuit.

2. The coil apparatus according to claim 1, wherein a winding region formed by the third winding section is larger than a winding region formed by the second winding section, and in a plan view in a plane intersecting with a winding axis of the second winding section or the third winding section, the winding region formed by the second winding section is formed on the inside of the winding region formed by the third winding section.

3. The coil apparatus according to claim 1, wherein a winding region formed by the third winding section is larger than a winding region formed by the first winding section, and in a plan view in a plane intersecting with a winding axis of the first winding section or the third winding section, the winding region formed by the first winding section is formed on the inside of the winding region formed by the third winding section.

4. A non-contact power transmission apparatus, comprising the coil apparatus according to claim 1.

5. The coil apparatus according to claim 1,
    wherein the third winding section does not contribute to power transmission.

6. The coil apparatus according to claim 1,
    wherein the other of the power transmission coil apparatus and the power receive coil apparatus includes:
    another first winding section which constitutes another first resonance circuit together with another first capacitance element;
    another second winding section which constitutes another excitation coil, and which is magnetically coupled to the other first winding section; and
    another third winding section which constitutes another second resonance circuit together with another second capacitance element, and which is magnetically coupled to the other first winding section; and
    wherein (1) if the other second winding is for the power transmission coil apparatus, the other second winding is connected to the power source, and (2) if the other second winding is for the power receive coil apparatus, the other second winding is connected to the load.

* * * * *